US011437072B2

(12) United States Patent
Huang et al.

(10) Patent No.: US 11,437,072 B2
(45) Date of Patent: Sep. 6, 2022

(54) RECORDING PRESENTATIONS USING LAYERED KEYFRAMES

(71) Applicant: MOXTRA, INC., Cupertino, CA (US)

(72) Inventors: He Huang, San Jose, CA (US); Subrah S. Iyar, Los Gatos, CA (US)

(73) Assignee: Moxtra, Inc., Cupertino, CA (US)

(*) Notice: Subject to any disclaimer, the term of this patent is extended or adjusted under 35 U.S.C. 154(b) by 0 days.

(21) Appl. No.: 16/270,297

(22) Filed: Feb. 7, 2019

(65) Prior Publication Data

US 2020/0258545 A1 Aug. 13, 2020

(51) Int. Cl.

*G11B 27/32* (2006.01)
*G11B 27/00* (2006.01)
*G11B 27/031* (2006.01)
*H04N 5/92* (2006.01)

(52) U.S. Cl.

CPC .......... *G11B 27/031* (2013.01); *G11B 27/002* (2013.01); *G11B 27/326* (2013.01); *H04N 5/9202* (2013.01)

(58) Field of Classification Search

CPC ... G11B 27/031; G11B 27/002; G11B 27/326; H04N 5/9202
USPC .................................................. 386/348, 241
See application file for complete search history.

(56) References Cited

U.S. PATENT DOCUMENTS 6,546,405 B2 4/2003 Gupta
6,789,105 B2 9/2004 Ludwig
7,992,215 B2 8/2011 Bartholomew
8,266,214 B2 9/2012 Hon
8,935,265 B2 1/2015 Tang
9,992,241 B1 * 6/2018 Huang ................ H04M 7/0027
10,638,192 B2 * 4/2020 Lu ...................... H04N 21/2187
2001/0020954 A1 * 9/2001 Hull ...................... H04L 65/403 715/730
2008/0276159 A1 11/2008 Narayanaswami
2009/0123025 A1 * 5/2009 Deng .................. G06K 9/3266 382/100
2009/0193327 A1 7/2009 Roychoudhuri
2011/0013882 A1 * 1/2011 Kusunoki ........ H04N 21/44008 386/241
2012/0163771 A1 * 6/2012 Li ...................... H04N 21/2387 386/241
2012/0236201 A1 9/2012 Larsen
2014/0006921 A1 1/2014 Gopinath
2014/0089794 A1 * 3/2014 Huang ................. G06F 16/168 715/704

(Continued)

*Primary Examiner* — Helen Shibru
(74) *Attorney, Agent, or Firm* — Adibi IP Group, PC; Amir V. Adibi; Andrew C. Palmer

(57) ABSTRACT

A layered-keyframe-based, presentation recording service provides for presentation recording sessions, the recording of presentations, and the creation of presentation videos. A user records with the user's device the document pages and page annotations, as well audio and video streams, that are presented using the device during the course of a presentation recording session. The pages, annotations and video streams are efficiently and separately recorded as keyframes. These keyframes are used as document, annotation and video layers to create layered keyframes. A presentation video is created from the layered keyframes and the recorded audio stream. Users can then playback presentation videos at a time, place and manner that is available to, accessible by and/or convenient to them.

20 Claims, 12 Drawing Sheets

600
Document Layer 610
Annotation Layer 620
Video Layer 630
640
Sequence of Layered Keyframes
650
Keyframe Video

(56) References Cited

U.S. PATENT DOCUMENTS

| | | | | |
|---|---|---|---|---|
| 2017/0039867 | A1* | 2/2017 | Fieldman | G11B 27/031 |
| 2017/0214723 | A1* | 7/2017 | Sanso | G06F 16/686 |
| 2018/0075883 | A1* | 3/2018 | Aroyo | G11B 27/102 |
| 2018/0341811 | A1* | 11/2018 | Bendale | G06K 9/3233 |
| 2019/0236547 | A1* | 8/2019 | Huang | H04L 65/4015 |

* cited by examiner

RECORDING PRESENTATIONS USING LAYERED KEYFRAMES

FIELD OF THE DISCLOSURE

The disclosure relates to presentations and electronic communications, and more specifically to the conducting, recording and subsequent playback of presentations.

BACKGROUND

Presentations are spoken communication in which such things as ideas, products, artwork and organizational performance are explained, often with the help of visual aids like graphics, charts and text. Since as early as the 1980s, overhead projectors were used to display visual aids on a transparency sheet ('overheads'), which could be annotated by the presenter with a permanent pen or marker. Later, slide projectors were used to display visual aids on 35 mm photographic images, each held inside a plastic or card mount (a 'slide'). Today, computer hardware and software, particularly presentation software, are used to create and display visual aids, which are sometimes referred to as a 'slide deck'.

Organizations use presentations to inform, educate, motivate and persuade. Presentations are used in, among other things, sales, training, planning and internal communications. Often, the visual aids themselves (the presentation file or 'slide deck') are distributed without the accompanying speech or talk. This method of distribution removes the power of spoken word, combined with text, numbers and images, to engage the audience, and to effectively convey and retain information. Current technologies that capture speech and visual aids together include recording traditional meetings with video cameras; recording online meetings with, e.g., Cisco System, Inc.'s WebEx® videoconferencing; and recording features of presentation software, such as Microsoft Corporation's PowerPoint® and its record slide show feature. However, current technology relies heavily on video-camera recordings and on video-camera screen capture. The recording, distribution and playback of gigabytes of video data, even with compression, can be challenging in today's environment, where people work from multiple locations with disparate networks of numerous types, and on multiple devices of numerous types.

What is needed therefore is a more efficient method of recording, distributing and playing back presentations.

SUMMARY

Technology is disclosed for a layered-keyframe-based, presentation recording service that provides for presentation recording sessions, the recording of presentations, and the creation of presentation videos (the "technology"). The technology enables a user to record with the user's device the document pages and page annotations, as well audio and video streams, that are presented using the user's device during the course of a presentation recording session. The pages, annotations and video streams are recorded as keyframes. These keyframes are used as document, annotation and video layers to create layered keyframes. The technology enables the creation of a presentation video from the layered keyframes and the recorded audio stream. The technology enables users to playback presentation videos at a time, place and manner that is available to, accessible by and/or convenient to them.

In various embodiments, the technology provides a presentation recording service that can be used to conduct and record presentations. For example, in one embodiment, consider that a user (the presenter) wants to present a business's quarterly performance to her geographically-dispersed business team. The presenter is traveling on business and is in her hotel room after a long day of meetings. On her device, the presenter can open a document (in this case, the current, quarterly business report) and initiate a presentation recording session. The presenter can begin, pause and end recording. As she speaks to the content of the report using her device's microphone, the presenter can navigate through the report's pages. She can annotate the presented pages, e.g., circling or pointing to pertinent data points. Using the video camera on her device, the presenter can choose to present, or not to present, video of herself speaking. All of these actions presented using the presenter's device are recorded in separate keyframes—document keyframes, annotation keyframes and video keyframes. In this way, users can conduct and efficiently record a presentation that conveys information through documents, annotations, audio and video.

In various embodiments, the technology provides a presentation video service that can be used to create videos from recorded presentations, and that allows users to playback those presentations. Consider again the above example of one embodiment, the presenter is recording document keyframes, annotation keyframes, video keyframes and an audio stream as part of her presentation. When she ends recording, the presenter can combine the recorded keyframes and the recorded audio stream as a file in video format. Users who are members of her business team can access the file and playback the presentation from their devices. One team member could be traveling on business himself. Another team member could be in the New York location. A third team member could be working from his home office. In this way, users can individually receive the presented information on demand and anywhere.

BRIEF DESCRIPTION OF THE DRAWINGS

The drawings described herein are for illustrative purposes only of selected embodiments and not all possible implementations and are not intended to limit the scope of the present disclosure.

DETAILED DESCRIPTION

Definitions

Figure 1:
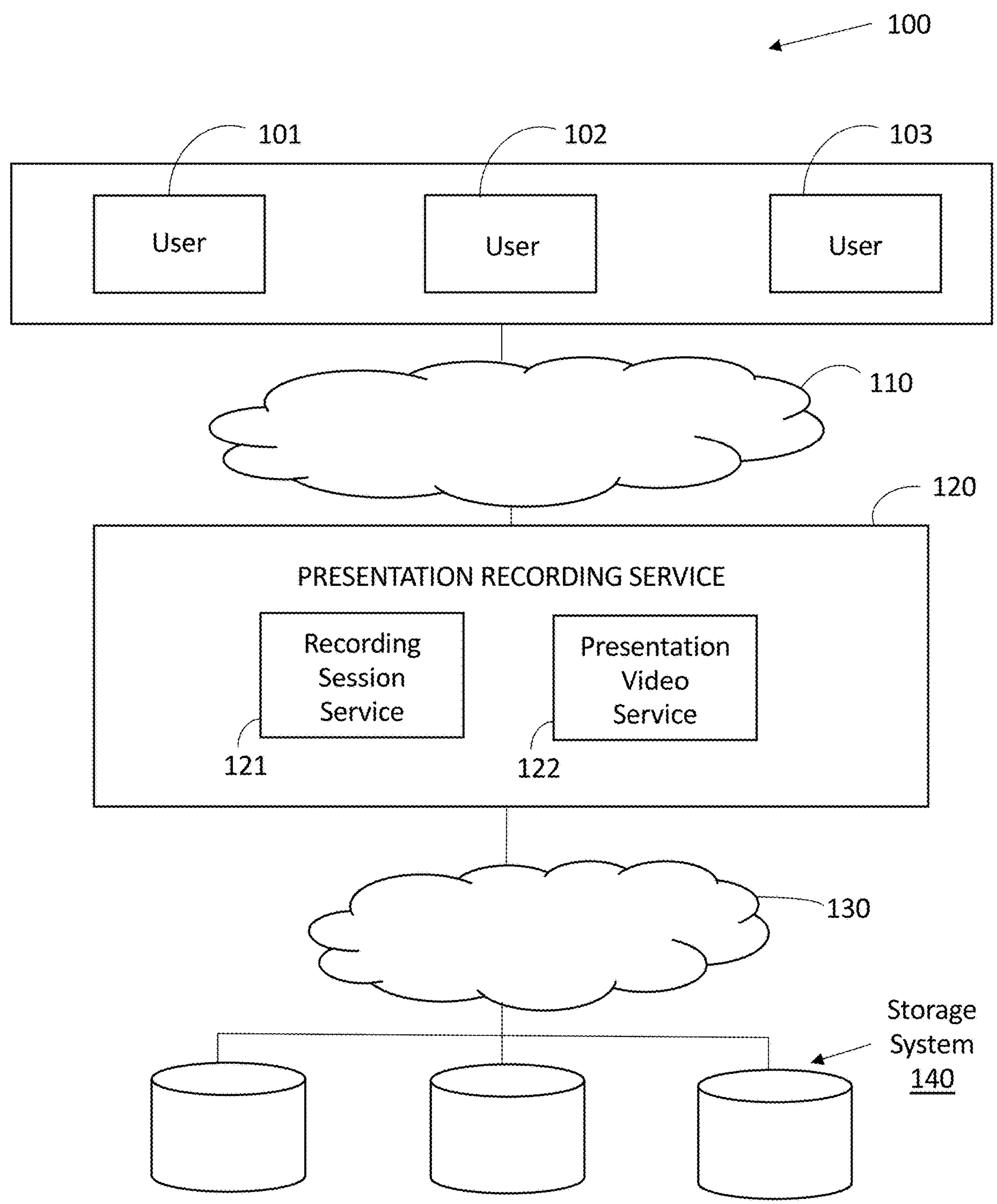
FIG. 1 is a block diagram illustrating an environment in which the technology may operate in various embodiments.

Video Frame: a component of video that may contain a still, digital image, such as a raster image, that—when played in sequence—creates a moving picture. Video may consist of a sequence of video frames that are played over time, usually denoted as frames per second.

Keyframe: a video frame, also referred to as an intra-frame or i-frame, that may contain a complete image.

Document Keyframe: a keyframe that may contain an image of a page of a document that was presented and recorded by a presenter at the time associated with a corresponding timestamp (document timestamp). A sequence of document keyframes (document keyframe sequence) may recreate the pages of a document presented by a user. In some embodiments, the image contained in a document keyframe may be a picture taken by a camera of the user's device of a portion of the screen of the user's device, which was stored as a JPEG image. In some embodiments, the JPEG image may be referenced in an SVG file.

Annotation Keyframe: a keyframe that may contain an image of an annotation of a page of a document that was presented and recorded by a presenter at the time associated with a corresponding timestamp (annotation timestamp). A sequence of annotation keyframes (annotation keyframe sequence) may recreate the annotations presented by a user. In some embodiments, the image contained in an annotation keyframe may be a picture taken by a camera of the user's device of a portion of the screen of the user's device, which was stored as a JPEG image. In some embodiments, the JPEG image may be referenced in an SVG file.

Video Keyframe: a keyframe that may contain an image of a video (video image) that was presented and recorded by a presenter at the time associated with a corresponding timestamp (video timestamp). A sequence of video keyframes (video keyframe sequence) may recreate the video presented by a user. In some embodiments, the image contained in a video keyframe may be a video frame taken from a video streamed by a video camera of the user's device to a portion of the screen of the user's device, which was stored as a JPEG image. In some embodiments, the JPEG image may be referenced in an SVG file. In some embodiments, the video streamed by the video camera may be stored as an MP4 file. Video images may be extracted from the MP4 file to be then contained in the video keyframes.

Raster Image: an image file format, also referred to as a bitmap image, that may be based on a grid of pixels (points of colors). Common file types for raster images are Joint Photographic Experts Group (JPEG), Graphics Interchange Format (GIF); Portable Network Graphic (PNG) and Tag Interleave Format (TIF).

Vector Image: an image file format that may be based on mathematical formulas that define geometric objects such as polygons, lines, curves, circles and rectangles.

Scalable Vector Graphics (SVG): a programming language for describing and producing two-dimensional graphics using XML. SVG may provide for three types of graphical objects: vector images, raster images and text. Graphical objects can be grouped, styled, transformed and composited into previously-rendered objects.

SVG Embedding: a function of SVG that may provide for embedding and rendering other content, such as raster images, in a vector image. The x, y, width, and height geometry properties can specify, e.g., a rectangular region (a positioning rectangle) into which the embedded content (such as a JPEG file) is rendered.

SVG Compositing: a feature of SVG whereby each graphic object element (vector image, raster image or text) in a SVG-defined graphic may be rendered and composited into the graphic's background in such a way that the individual elements overlay each other.

Layer: a component of a digital image that may be used in combination with other layers to create that image. A layer may consist of, e.g., a digital image, visual effect to be applied to an image, graphical object or text. Digital images are composed by superimposing a layer on top of another layer. In that way, layers are stacked to create a single, composite image.

Document Layer: a layer, which may consist of a document keyframe, and that has a corresponding document timestamp.

Annotation Layer: a layer, which may consist of an annotation keyframe, and that has a corresponding annotation timestamp.

Video Layer: a layer, which may consist of a video keyframe, and that has a corresponding video timestamp.

Layered Keyframe: a keyframe with a corresponding timestamp that may contain a combination of a document layer, an annotation layer and/or a video layer. A sequence of layered keyframes (layered keyframe sequence) may recreate the document pages, annotations and video presented by a user. In some embodiments, a layered keyframe is created by superimposing an annotation layer on a document layer, and then superimposing a video layer on that annotation layer.

Keyframe Frequency: a parameter that may determine the frequency of the recordation of document, annotation and video keyframes. For example, when keyframe frequency is one second, keyframes are recorded every second.

Keyframe Video: a video that may be created through transcoding a sequence of layered keyframes into video format.

Presentation Video: a video that may be created through combining a keyframe video and the recorded audio stream from a presentation recording session.

Moving Picture Experts Group (MPEG) is a set of international standards and file formats for encoding and compressing audio/video data.

MPEG-4 Part 14: a digital multimedia container format most commonly used to store audio and video but can also be used to store other data such as subtitles and still images. For example, audio-only files in MPEG-4 Part 14 format are stored in files with file time '.m4a' filetypes (M4A files). Some M4A files use Advanced Audio Coding (AAC) as the codec to encode and compress audio data. Multimedia files (including audio and video) in MPEG-4 Part 14 format are stored in files with file type '.mp4' (MP4 files). .m4v is the video equivalent of .m4a, while .mp4 can be used for various types of multimedia files.

Opus: a codec that may be used to encode and compress audio data in a lossy audio coding format. Opus is designed to efficiently code audio with low latency for real-time communications and low-complexity for embedded processors.

H.264: a video compression technology, or codec, that was jointly developed by the International Telecommunications Union (as H.264) and International Organization for Standardization/International Electrotechnical Commission Moving Picture Experts Group (as MPEG-4 Part 10, Advanced Video Coding, or AVC).

Transcode: a process that may be used to convert an existing digital format to a different digital format. For example, a transcoding process can convert a two-dimensional graphics produced with SVG file to raster image in JPEG format. A transcoding process can also convert a series of still images in JPEG format to a video in MP4 format.

Timestamp: a record of time that may be associated with when a document keyframe, an annotation keyframe, a video keyframe, or an audio stream was recorded. Timestamps associated with document keyframes are also referred to as document timestamps. Timestamps associated with annotation keyframes are also referred to as annotation timestamps. Timestamps associated with video keyframes are also referred to as video timestamps. Timestamps associated with an audio stream are also referred to as audio timestamps.

Video encoding: function that may convert digital video files from one format to another format.

XML: a programming language and, more specifically, a markup language that may define a set of rules for encoding documents. It also plays an important role in the exchange of a wide variety of data on the Internet. XML stands for Extensible Markup Language.

Environment for Presentation Recording Service

Technology is disclosed for a document-based, presentation recording service that provides for presentation recording sessions, and the creation of presentation videos (the "technology"). Several embodiments of the technology are described in more detail in reference to the figures. Turning to FIG. 1, FIG. 1 is a block diagram illustrating an environment 100 in which the technology may operate in various embodiments. The environment 100 includes a presentation recording service 120 that provides a set of services, including services such as a recording session service 121 and a presentation video service 122 to a set of users, e.g., user 101, user 102 and user 103. The set of users may access the document-based, presentation recording service 120 via a communication network 110 using a variety of devices, including a desktop, a laptop, a tablet PC, or a smart phone.

In various embodiments, presentation recording service 120 provides for the recording of document-based presentations and the creating of presentation videos, for a set of users, such as users 101, 102 and 103. Recording session service 121 allows users to initiate, conduct and complete a presentation recording session where actions of a presenting user as presented on the device of the presenter (e.g., pages of documents, annotations of pages, and audio and video data) are recorded. The presentation video service 122 allows users to create a presentation video, which includes the document pages, annotations, audio and video that were recorded during a presentation recording session.

In various embodiments, the presentation video may not be configured to be stored on a local device of the user. The presentation videos are configured to be stored in an online storage system such as storage system 140. Storage system 140 stores presentation videos, as well as pages of documents, annotations, audio and video that were recorded and uploaded by users. Storage system 140 can include a set of databases. In various embodiments, storage system 140 may be configured as a cloud storage system that can be distributed among different geographical locations. The pages associated with a particular document, e.g., can be stored in the same database of storage system 140 or in different databases of storage system 140. Further, storage system 140 may be set up separate from presentation recording service 120, for example, on different machines and/or in different geographical locations. Presentation recording service 120 can access storage system 140 via a communication network 130.

Presentation recording service 120 may be implemented in a variety of configurations. One typical configuration may include an online configuration in which presentation recording service 120 is implemented in a distributed network, for example, LAN, WAN or Internet. Users access presentation recording service 120 over a communication network such as network 110. In various embodiments, presentation recording service 120 may also be implemented in a client-server configuration in which an application corresponding to the client portion may be installed on the device of the user. Users may access presentation recording service 120 using a web browser or a presentation recording service application installed on the device of the user.

Presentation Recording Service

Figure 2:
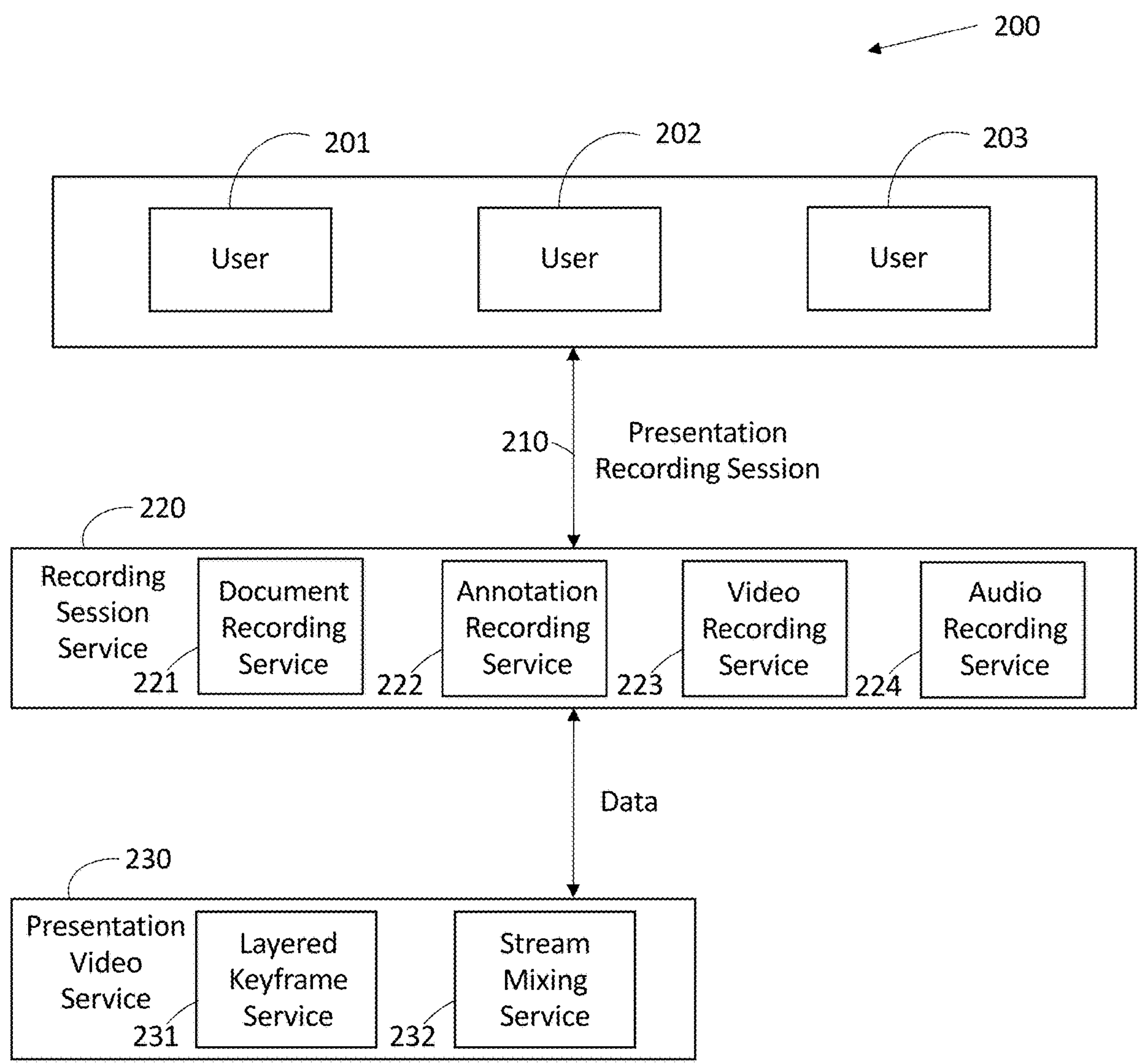
FIG. 2 is a block diagram illustrating an environment for providing a recording session service and a presentation video service, consistent with various embodiments.

Turning now to FIG. 2, FIG. 2 is a block diagram, consistent with various embodiments, illustrating an environment 200 for the presentation recording service of FIG. 1. Recording session service 220 of environment 200 may be similar to presentation recording service 121 of FIG. 1. Presentation video service 230 of environment 200 may be similar to presentation video service 122 of FIG. 1. Users 201, 202 and 203 of environment 200 may be similar to users 101, 102 and 103 of FIG. 1.

To facilitate the creation of a presentation video from the recordation of a presenting user's action on that user's device, the recorded pages of documents, annotations of document pages and video streaming data are stored as video frames in a common format. Video frames are a component of video that contains a still, digital image, such as a raster image (e.g., a JPEG file), that—when played in sequence—creates a moving picture. Video consists of a sequence of video frames that are played over time, usually denoted as frames per second.

Keyframes, which are also referred to as an intra-frame or i-frame, are video frames that that contain a complete image. As will be discussed in more detail below, recorded document pages, annotations and video streams are stored as keyframes in a common format.

In various embodiments, the common format can include a JPEG image in that is referenced in a Scalable Vector Graphics (SVG) file. SVG is a programming language for describing and producing two-dimensional graphics using XML. SVG provides for three types of graphical objects: vector images, raster images and text. Vector images are based on mathematical formulas that define geometric objects such as polygons, lines, curves, circles and rectangles. SVG images and their behaviors are defined in XML text files. These files can be searched, indexed, scripted, and compressed. The SVG format also includes variants, e.g., mobile profiles, that are used for mobile devices or devices with reduced computational and display capabilities. Although JPEG images referenced in SVG files is suitable for being used as a common format, the common format is not limited to JPEG images referenced in SVG files.

Recording Session Service

Turning back to FIG. 2, recording session service 220, consistent with various embodiments, provides for the initiation, conducting, and completion of a presentation recording session, such as presentation recording session 210, by a user, such as user 201, 202 or 203. Recording session service 220 provides a set of services, including services such as a document recording service 221, annotation recording service 222, video recording service 223 and audio recording service 224. Recording session service 220 sets initial values for the presentation recording session's timestamp and keyframe frequency. Timestamps are records of the time an associated document keyframe, annotation keyframe, video keyframe or an audio stream was recorded. Timestamps associated with document keyframes are also referred to as document timestamps. Timestamps associated with annotation keyframes are also referred to as annotation timestamps. Timestamps associated with video keyframes are also referred to as video timestamps. Timestamps associated with an audio stream are also referred to as audio timestamps. For example, the initial value for a timestamp can be zero seconds (e.g., '0000'). Keyframe frequency is a parameter that determines the frequency of the recordation of keyframes. For example, when the keyframe frequency is set to one second, keyframes are recorded every second.

Document recording service 221 provides for the recordation of pages of documents presented using a user's device during the course of a presentation recording session, along with their corresponding document timestamps, consistent with various embodiments. Document recording service 221 records document keyframes. Document keyframes are keyframes that contain an image of a page of a document that was presented at the time associated with a corresponding document timestamp. A sequence of document keyframes may recreate the pages of a document presented by a user. A document keyframe sequence is a sequence of document keyframes with corresponding document timestamps that were recorded by a presenter during the course of a presentation recording session.

In some embodiments, the image contained in a document keyframe may be a picture taken by a camera of the user's device of a portion of the screen of the user's device, which was stored as a JPEG image. In some embodiments, the JPEG image may be referenced in an SVG file. Document recording service 221 provides for recording document keyframes at the keyframe frequency, such as every second, during the course of a presentation recording session. Recording a document keyframe every second corresponds to a video frame rate of one second, or to frames per second (FPS) of one.

For example, during the course of a presentation recording session, a user may have presented a quarterly business report that was contained in a multi-page, PDF document. From the start of the session (e.g., at 1 second) to nine minutes (e.g., at 540 seconds) into the session, the user presented page one of the quarterly business report using the user's device. Document recording service 221, consistent with various embodiments, recorded 540 document keyframes with corresponding document timestamps ranging from '0001' to '0540'. The images contained in those 540 keyframes were a JPEG image, which is referenced in SVG files, of page one of the quarterly business report. From ten minutes into the session (e.g., at 600 seconds) to fourteen minutes (e.g., at 840 seconds) into the session, the user presented page six of the quarterly business report using the user's device. Document recording service 221 recorded 240 document keyframes with corresponding document timestamps ranging from '0600' to '0840'. The images contained in those 240 keyframes would be JPEG images, which are referenced in SVG files, of page six of the quarterly business report. In this way, a user records the pages of documents presented using the user's device during the course of a presentation recording session, along with their corresponding document timestamps, consistent with various environments.

Turning back to FIG. 2, annotation recording service 222 provides for the recordation of annotations of pages of documents presented using a user's device during the course of a presentation recording session, along with their corresponding annotation timestamps, consistent with various embodiments. Annotation recording service 222 records annotation keyframes. Annotation keyframes are keyframes that contain an image of an annotation of a page of a document that was presented and recorded by a presenter at the time associated with a corresponding annotation timestamp. A sequence of annotation keyframes can recreate the annotations presented by a user. An annotation keyframe sequence is a sequence of annotation keyframes with corresponding annotation timestamps that were recorded by a presenter during the course of a presentation recording session.

In some embodiments, the image contained in an annotation keyframe may be a picture taken by a camera of the user's device of a portion of the screen of the user's device, which was stored as a JPEG image. In some embodiments, the JPEG image may be referenced in an SVG file. Annotation recording service 222 provides for recording annotation keyframes at the keyframe frequency, such as every second, during the course of a presentation recording session. Recording an annotation keyframe every second corresponds to a video frame rate of one second, or to frames per second (FPS) of one.

Continuing with the previous example, during the course of a presentation recording session, a user may have annotated certain pages of a quarterly business report. From five minutes (e.g., at 300 seconds) to five minutes and five seconds (e.g., at 305 seconds) into the session, the user annotated page one of the quarterly business report by drawing a circle around a number on a page. Annotation recording service 222, consistent with various embodiments, recorded 6 annotation keyframes with corresponding annotation timestamps ranging from '0300' to '0305'. The images contained in those 6 keyframes were a JPEG image, which is referenced in SVG files, of the circle annotation made on page one of the quarterly business report. From eleven minutes into the session (e.g., at 660 seconds) to eleven minutes and four seconds (e.g., at 664 seconds) into the session, the user annotated page six of the quarterly business report by drawing an arrow to a figure on the page. Annotation recording service 222 recorded 5 annotation keyframes with corresponding annotation timestamps ranging from '0660' to '0664'. The images contained in those 5 keyframes were a JPEG image, which is referenced in SVG files, of the arrow annotation made on page six of the quarterly business report. In this way, a user records the annotations of document pages presented using the user's device during the course of a presentation recording session, along with their corresponding annotation timestamps, consistent with various embodiments.

Turning back to FIG. 2, video recording service 223 provides for the recordation of video presented using a user's device during the course of a presentation recording session, along with corresponding video timestamps, consistent with various embodiments. Video recording service 223 records video keyframes. Video keyframes contain images of a video (video images) that were presented and recorded by a presenter at the time associated with a corresponding video timestamp. A sequence of video keyframes can recreate the video presented by a user. A video keyframe sequence is a sequence of video keyframes with corresponding video timestamps that were recorded by a presenter during the course of a presentation recording session.

In some embodiments, the image contained in a video keyframe may be a video frame taken from a video streamed by a video camera of the user's device to a portion of the screen of the user's device, which was stored as a JPEG image. In some embodiments, the JPEG image may be referenced in an SVG file. In some embodiments, the video streamed by the video camera may be stored as an MP4 file. Video images may be extracted from the MP4 file to be then contained in the video keyframes. Video recording service 223 provides for recording video keyframes at the keyframe frequency, such as every second, during the course of a presentation recording session. Recording a video keyframe every second corresponds to a video frame rate of one second, or to frames per second (FPS) of one.

Continuing with the previous example, during the course of a presentation recording session, a user may have presented video streams. From six minutes (e.g., at 360 seconds) to eight minutes and thirty seconds (e.g., at 510 seconds) into the session, the user presented a video stream in a minimized video window in the upper, right-hand portion of the user's screen. Video recording service 223, consistent with various embodiments, recorded a two minute and thirty second video stream, corresponding to video timestamps '0360' and '0510'. From the recorded video stream, video recording service 223 recorded 151 video keyframes with corresponding video timestamps ranging from '0360' to '0510'. The images contained in those 151 keyframes were the JPEG images from the video frames of the recorded video stream with the corresponding video timestamps. The JPEG images were then referenced in corresponding SVG files.

From nine minutes and fifteen seconds (e.g., at 555 seconds) to ten minutes and twenty-four seconds (e.g., at 624 seconds) into the session, the user presented a video stream in a maximized video window, which filled the entirety of the user's screen. Video recording service 223, consistent with various embodiments, recorded a one minute and nine second video stream, corresponding to video timestamps '0555' and '0624'. From the recorded video stream, video recording service 223 recorded 70 video keyframes with corresponding video timestamps ranging from '0555' to '0624'. The images contained in those 70 keyframes were the JPEG images from the video frames of the recorded video stream with the corresponding video timestamps. The JPEG images were then referenced in corresponding SVG files. In this way, a user records the video streams presented using the user's device during the course of a presentation recording session, along with their corresponding video timestamps.

Turning back to FIG. 2, audio recording service 224 provides for the recordation of an audio stream presented during the course of a presentation recording session, along with its corresponding audio timestamps, consistent with various embodiments. In some embodiments, a microphone of the user's device creates an audio stream from speech and other sounds presented during a presentation. In some embodiments, the recorded audio stream may be stored as an M4A file and/or compressed using the Opus codec. Audio recording service 224 records the audio stream that was presented at the time associated with corresponding audio timestamps.

Continuing with the previous example, during the course of a presentation recording session, a user may have spoken about a quarterly business report. From the start of the session (e.g., at 1 second) to the end of the session (e.g., at 1,626 seconds), the user discussed the quarterly business report. Audio recording service 224, consistent with various embodiments, recorded the audio stream with corresponding audio timestamps ranging from '0001' to '1626'. In this way, a user records audio streams presented during the course of a presentation recording session, along with their corresponding audio timestamps, consistent with various environments.

Presentation Video Service

Turning back to FIG. 2, presentation video service 230, consistent with various embodiments, provides for the creation of a presentation video, which includes the document pages, annotations, audio and video that were presented and recorded during a presentation recording session, such as presentation recording session 210, by a user, such as user 201, 202 or 203. Presentation video service 230 provides a set of services, including services such as layered keyframe service 231 and stream mixing service 224.

To facilitate the creation of a presentation video, the recorded document, annotation and video keyframes are used as layers. A layer is a component of a digital image that is used in combination with other layers to create that image. A layer may consist of, e.g., a digital image, a visual effect to be applied to an image, a graphical object or text. Digital images are composed by repetitively superimposing a layer on top of another layer. In that way, layers are stacked to create a single, composite image. A document layer is a layer, which consists of a document keyframe, and that has a corresponding document timestamp. An annotation layer is a layer, which consists of an annotation keyframe, and that has a corresponding annotation timestamp. A video layer is a layer, which consists of a video keyframe, and that has a corresponding video timestamp.

A layered keyframe is a keyframe with a corresponding timestamp where a document layer, an annotation layer and/or a video layer are combined. A sequence of layered keyframes (layered keyframe sequence) may recreate the document pages, annotations and video presented by a user. In some embodiments, a layered keyframe is created by superimposing an annotation layer on a document layer, and then superimposing a video layer on that annotation layer.

In some embodiments, the layers can be superimposed using SVG embedding and compositing. SVG embedding is a function of SVG that provides for embedding and rendering other content, such as raster images, in a vector image. A set of geometric properties, such as x, y, width, and height, can specify, e.g., a rectangular region (a positioning rectangle) into which embedded content (such as a JPEG file) is rendered. SVG compositing is a feature of SVG whereby each graphic object element (vector image, raster image or text) in an SVG-defined graphic is rendered and composited into the graphic's background in such a way that the individual elements overlay each other. Although SVG embedding and compositing are suitable for creating layered keyframes, methods for creating layered keyframes are not limited to SVG, generally, or SVG embedding and compositing, specifically.

Turning back to FIG. 2, layered keyframe service 231 provides for the creation of layered keyframes with corresponding timestamps through the combination of document layers, annotation layers and/or video layers with corresponding timestamps of the same value, consistent with various embodiments. A layered keyframe may contain an image of a page of a document, an image of an annotation of that page of the document and an image of a video, all of which were presented at the time associated with their corresponding timestamps of the same value. A sequence of layered keyframes may recreate the document pages, annotations and video presented by a user during the course of a recorded, presentation recording session.

For example, at eight minutes and forty-three seconds (e.g., 543 seconds) into a presentation recording session, a user presented page two of a quarterly business report; annotated page two by drawing a circle; and presented a video stream in a minimized video window. As a result, a document keyframe, annotation keyframe and a video keyframe were created, each with a corresponding timestamp of the same value—'0543'. Layered keyframe service 231, consistent with various embodiments, created a layered keyframe with a corresponding timestamp value of '0543' by superimposing the annotation keyframe on the document keyframe; followed by superimposing the video keyframe on the annotation keyframe. In this way, a single, composite image is created that recreates a point in time during the course of a presentation corresponding to a timestamp.

Continuing with the previous example, a user may have completed a presentation recording session at twenty-seven minutes and forty-five seconds into the session. As a result, document, annotation and/or video keyframe sequences were created with corresponding timestamps ranging from '0001' to '1665'. For each timestamp value, from '0001' to '1665', layered keyframe service 231 would create a layered keyframe by superimposing document, annotation and/or video keyframes with corresponding timestamps of the same value. In this way, layered keyframe service 231 created a layered keyframe sequence that recreates the document pages, annotations and video presented by the user during the course of the session.

Layered keyframe service 231 also provides for the creation of a keyframe video from the layered keyframe sequence through transcoding of the digital images into a video format, consistent with various embodiments. Transcoding is a process of converting an existing digital format to a different digital format. For example, a transcoding process can convert two-dimensional graphics produced with SVG file to a raster image in JPEG format. A transcoding process can also convert a series of still images in JPEG format to a video in MP4 format. In some embodiments, the keyframe video created by layered keyframe service 231 is stored as a MP4 file.

Turning back to FIG. 2, stream mixing service 232 provides for the creation of a presentation video through the combination of a video stream and an audio stream, consistent with various embodiments. Stream mixing service 232 combines the keyframe video created by layered keyframe service 231 from a presentation recording session with the audio stream data recorded by audio recording service 224 from the presentation recording session. Stream mixing service 232 synchronizes the video stream and the audio stream through their associated timestamps. In some embodiments, the presentation video created by stream mixing service 232 is stored as a MP4 file. In some embodiments, the presentation video is compressed using H.264 codec.

Keyframe Transport

In various embodiments, presentation recording service 120 of FIG. 1 may be implemented in a client-server configuration in which an application corresponding to the client portion may be installed on the device of the user. In some embodiments, recording session service 220 may be implemented as an application corresponding to the client portion; and presentation video service 230 may be implemented as an application corresponding to the server portion. The client-server configuration may be implemented in a distributed network (e.g., LAN, WAN or Internet), using networks such as networks 110 and 130 of FIG. 1.

In various embodiments implemented in the above-described client-server configuration or similar configurations, recording session service 220 provides for the network transport of the recorded keyframes from a device of a user to a device of a server. Recording session service 220 compares a keyframe (e.g., "Keyframe 2") to its preceding keyframe (e.g., "Keyframe 1"). If there are no differences between Keyframe 2 and Keyframe 1, recording session service 220 does not transport Keyframe 2. If there are differences, recording session service 220 does transport Keyframe 2 to presentation video service 230.

For example, recording session service 220 compares document keyframe with a document timestamp of '0016' ("Document Keyframe 0016") to a document keyframe with a document timestamp of '0015' ("Document Keyframe 0015"). Document Keyframe 0016 contains an image of page 6 of a document. Document Keyframe 0015 contains an image of the same page. Recording session service 220 determines that there a no differences between the keyframes, does not transport Document Keyframe 0016 and notifies presentation video service 230 of the determination. Recording session service 220 next compares document keyframe with a document timestamp of '0017' ("Document Keyframe 0017") to Document Keyframe 0016. Document Keyframe 0017 contains an image of page 7 of a document. Document Keyframe 0016 contains an image of page 6 of the document. Recording session service 220 determines that there are differences between the keyframes and transports Document Keyframe 0017 to presentation video service 230. In this way, processing and storage efficiencies are achieved.

Figure 3:
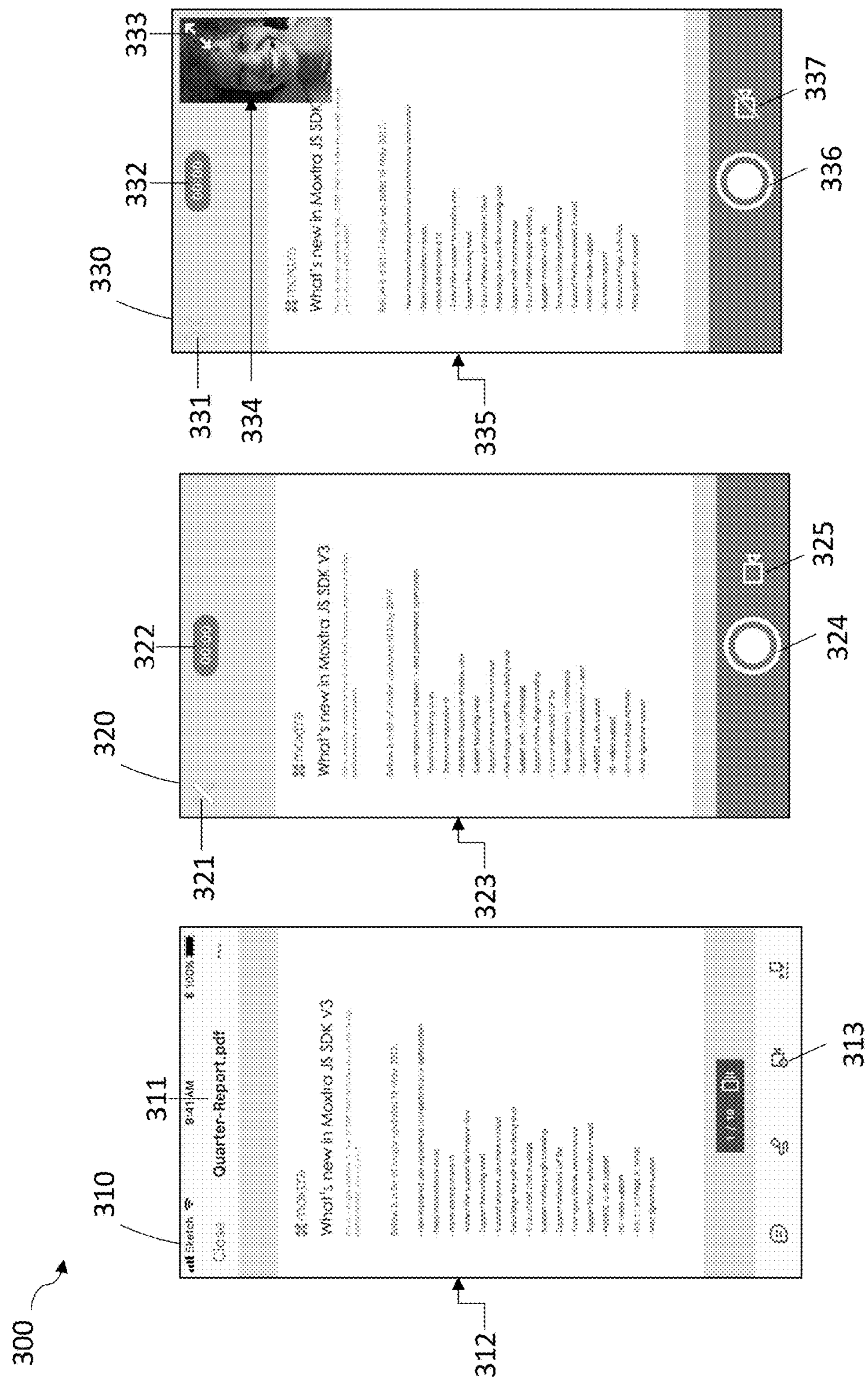
FIG. 3 is a series of exemplar screen shots from a device of a user of FIG. 2, which show the initiation of a presentation recording session, consistent with various embodiments.

Turning now to FIG. 3, FIG. 3 shows three exemplar screen shots 300 from a device of a user of FIG. 2, consistent with various embodiments. Screen shot 310 shows currently-presented page 312 of document 311, which has a filename of 'Quarter-Report.pdf', that user had previously opened. User may begin a presentation recording session by selecting presentation-recording-session icon 313. Screen shot 320 shows a presentation recording session after user selected presentation-recording-session icon 313. User is shown currently-presented page 323 of document 311. User is shown current recorded time 322, which has a value of '00:00'. User may end the presentation recording session by selecting close icon 321. User may begin recording by selecting record icon 324. User may enable video by selecting video icon 325.

Screen shot 330 shows the presentation recording session after user selected the video icon 325, consistent with various embodiments. User is shown currently-presented page 335 of document 311. User is shown current recorded time 332, which has a value of '00:00', that indicates no time of user's presentation has been recorded. User is shown the current video image from the front-facing, video camera of user's device in minimized-video window 334. User may end the presentation recording session by selecting close icon 331. User may begin recording by selecting record icon 336. User may disable video by selecting the video-off icon 337. User may maximize minimized-video window 334 by selecting the maximize-minimize icon 333.

Figure 4:
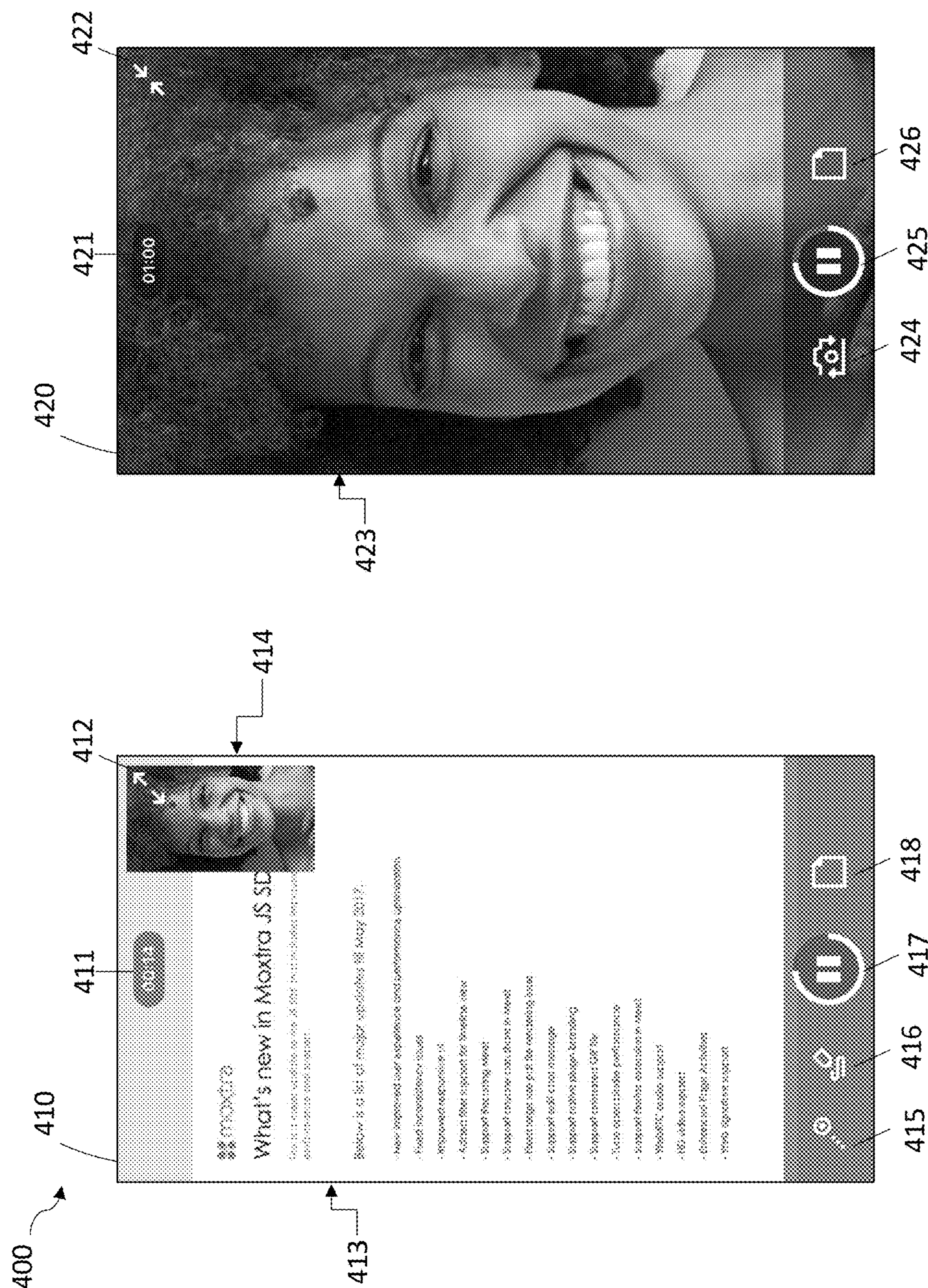
FIG. 4 is an exemplar screen shot from a device of a user of FIG. 2, which show a presentation recording session in progress, consistent with various embodiments.

Turning now to FIG. 4, FIG. 4 shows two exemplar screen shots 400 from a device of a user of FIG. 2, consistent with various embodiments. Screen shot 410 shows a currently-recording, presentation recording session after user selected record icon 336 of FIG. 3. User is shown currently-presented page 413 of document 311 of FIG. 3. User is shown current recorded time 411, which has a value of '00:14', that indicates that fourteen seconds of user's presentation has been recorded. User is shown the current video image from the front-facing, video camera of user's device in minimized-video window 414. User had previously selected video icon 325 of FIG. 3. User may maximize minimized-video window 414 by selecting the maximize-minimize icon 412. User may make annotations to currently-presented page 413 by selecting annotation icon 416. User may use a pointer to direct attention to points on currently-presented page 413 by selecting pointer icon 415. User may change the presented page by selecting page-navigation icon 418. User may pause recording by selecting pause icon 417.

In this way, user records their actions during the presentation recording session. The currently-presented document page or pages are recorded. The presented audio is recorded. Any annotations are recorded. Any pointers, as a form of annotation, are recorded. Any video presented in a video window, minimized or maximized, is recorded.

Screen shot 420 shows a currently-recording, presentation recording session after user selected maximize-minimize icon 412, consistent with various embodiments. User is shown the current video image from the front-facing, video camera of user's device in maximized-video window 423. User is shown current recorded time 421, which has a value of '01:00', that indicates that one minute of user's presentation has been recorded. User may minimize maximized-video window 423 by selecting maximize-minimize icon 422. User may switch the source of the current video image from the front-facing to the rear-facing video camera of user's device by selecting switch-camera icon 424. User may change currently-presented page 413 by selecting page-navigation icon 426. User may pause recording by selecting pause icon 425.

Figure 5:
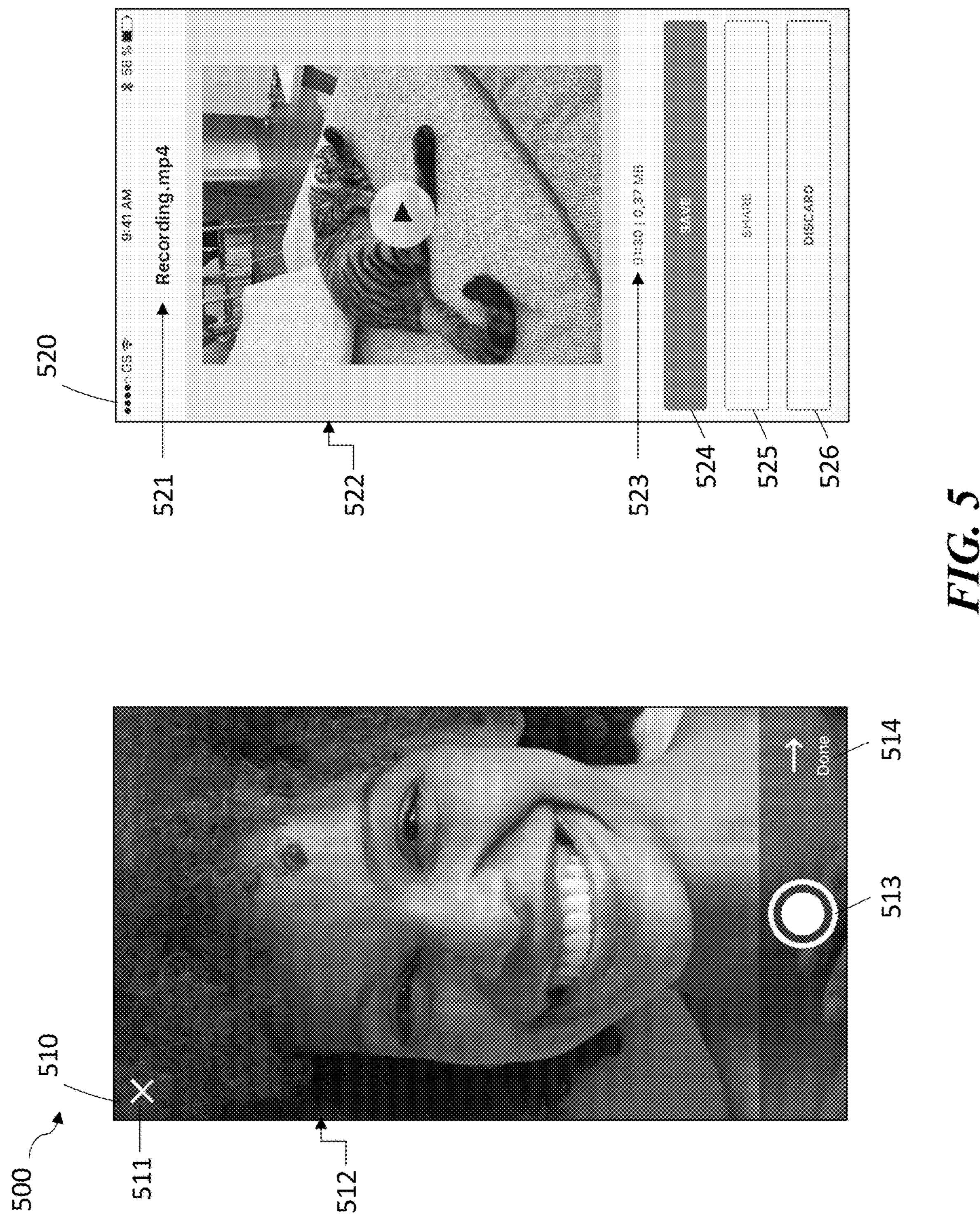
FIG. 5 is a series of exemplar screen shots from a device of a user of FIG. 2, which show the completion of a presentation recording session, consistent with various embodiments.

Turning now to FIG. 5, FIG. 5 shows two exemplar screen shots 500 from a device of a user of FIG. 2, consistent with various embodiments. Screen shot 510 shows a presentation recording session user selected pause icon 425 of FIG. 4. User is shown the most recently recorded video image from the front-facing, video camera of user's device in maximized-video window 512. User had previously selected the maximize-minimize icon 412 of FIG. 4. User may end the presentation recording session by selecting close icon 511. User may resume recording by selecting record icon 513. User may conclude recording by selecting done icon 514.

Screen shot 520 shows a presentation recording session after user selected done icon 514, consistent with various embodiments. Screen shot 520 shows video image 522 from presentation video 521, which has a filename of 'Recording.mp4', that was created when user selected done icon 514. Presentation video 521 recreates user's presentation recording session. User is shown attributes 523 of presentation video 521; length in time, which has a value of '01:30', and size, which has a value of '0.37 MB'. User may save presentation video 521 by selecting save icon 524. User may share presentation video 521 with other users by selecting share icon 525. User may discard presentation video 521 by selecting discard icon 526.

Figure 6:
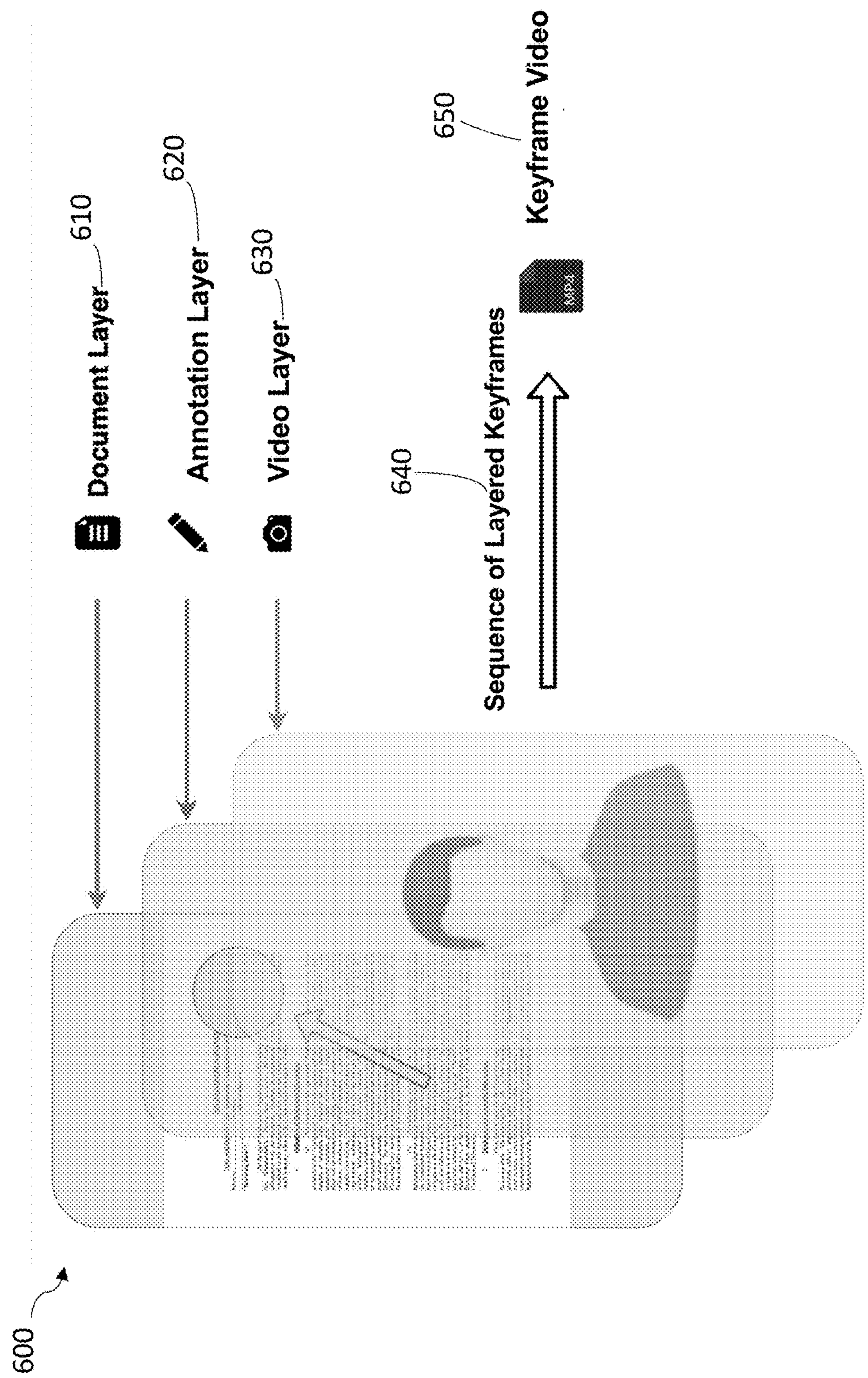
FIG. 6 is an illustration of creating a layered keyframe by superimposing a document layer, an annotation layer and a video layer and then transcoding a sequence of layered keyframes to a keyframe video, consistent with various embodiments.

Turning now to FIG. 6, FIG. 6 is an illustration 600 of creating a layered keyframe by superimposing a document layer, an annotation layer and a video layer; and of then transcoding a sequence of layered keyframes to a keyframe video, consistent with various embodiments. Document layer 610 corresponds to a document keyframe, which was recorded by document recording service 221 of FIG. 2, that consists an image of a page of a document that was presented at the time associated with a document timestamp (e.g., a timestamp of '0100'). Annotation layer 620 corresponds to an annotation keyframe, which was recorded by annotation recording service 222 of FIG. 2, that consists an image of an annotation that was presented at the time associated with an annotation timestamp of the same value (i.e., '0100'). Video layer 630 corresponds to a video keyframe, which was recorded video recording service 223 of FIG. 2, that consists of an image of a video frame that was presented at the time associated with a video timestamp of the same value.

At 640, layered keyframe service 231 of FIG. 2 created a sequence of layered keyframes with corresponding timestamps through combining (superimposing) a sequence of document, annotation and video layers with corresponding timestamps, such as document layer 610, annotation layer 620 and video layer 630, from the earliest to the latest timestamps. Layered keyframe service 231 of FIG. 2 then created keyframe video 650 from the layered keyframe sequence through transcoding (encoding) the digital images into a video format.

Figure 7:
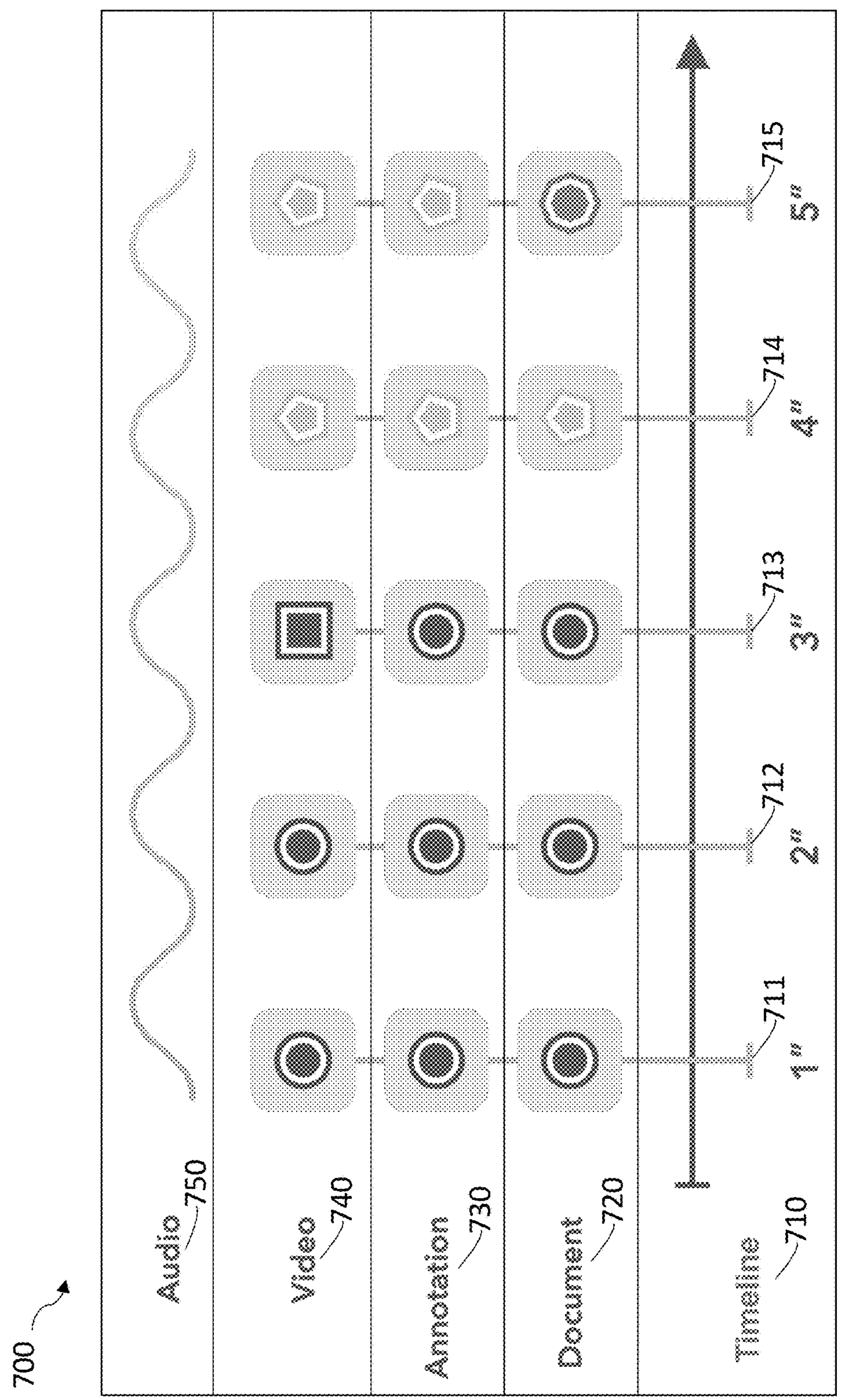
FIG. 7 is an illustration of recording document keyframes, annotation keyframes, video keyframes and an audio stream over time, consistent with various embodiments.

Turning now to FIG. 7, FIG. 7 is an illustration 700 of recording a sequence of document keyframes, annotation keyframes and video keyframes, and an audio stream over time, consistent with various embodiments. Document keyframe sequence 720 consists of document keyframes recorded by document recording service 221 of FIG. 2 during the course of a presentation recording session, which is represented by timeline 710. Similarly, annotation keyframe sequence 730 consists of recorded, annotation keyframes. Video keyframe sequence 740 consists of recorded, video keyframes. Document, annotation and video keyframes were recorded at one second 711, two seconds 712, three seconds 713, four seconds 714 and five seconds 715 into the presentation recording session. Audio stream 750 was recorded by audio recording service 224 of FIG. 2 during the course of the presentation recording session.

Figure 8:
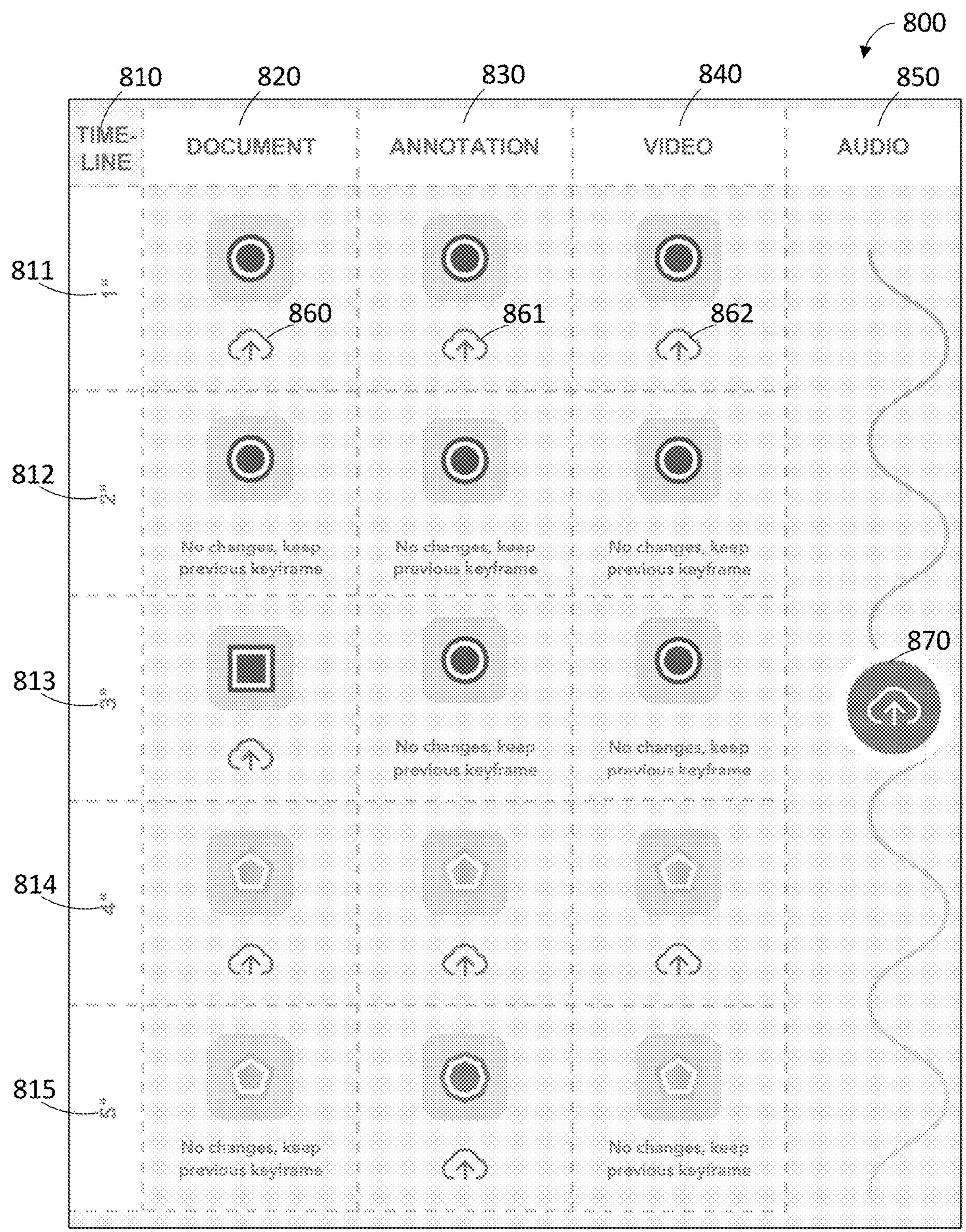
FIG. 8 is an illustration of transporting recorded document keyframes, annotation keyframes, video keyframes and a recorded audio stream over time, consistent with various embodiments.

Turning now to FIG. 8, FIG. 8 is an illustration 800 of transporting over time a sequence of recorded document keyframes, annotation keyframes, video keyframes, and a recorded audio stream, consistent with various embodiments. In some embodiments, document-based, presentation recording service 120 of FIG. 1 may be implemented in a client-server configuration. In some embodiments, recording session service 220 of FIG. 2, which is implemented in a client portion of the configuration, transports a sequence of recorded keyframes and a recorded audio stream over a network to presentation video service 230 of FIG. 2, which is implemented in a server portion of the configuration.

Document keyframe sequence 820, consistent with various embodiments, consists of document keyframes recorded by document recording service 221 of FIG. 2 during the course of a presentation recording session, which is represented by timeline 810. Similarly, annotation keyframe sequence 830 consists of recorded, annotation keyframes. Video keyframe sequence 840 consists of recorded, video keyframes. Document, annotation and video keyframes were recorded at one second 811, two seconds 812, three seconds 813, four seconds 814 and five seconds 815 into the presentation recording session. Audio stream 850 was recorded by audio recording service 224 of FIG. 2 during the course of the presentation recording session.

As indicated by transport symbols 860, 861 and 862, recording session service 220 of FIG. 2 transported the document, annotation and video keyframes, which were recorded at one second 811, over a network to presentation video service 230 of FIG. 2. As indicated by transport symbol 870, recording session service 220 of FIG. 2 transported the recorded, audio stream 850 over a network to presentation video service 230 of FIG. 2.

Recording session service 220 of FIG. 2, consistent with various embodiments, compared the keyframes recorded at one second 811 to their corresponding keyframes recorded at two seconds 812. Recording session service 220 of FIG. 2 determined that there were no differences between the keyframes; did not transport the keyframes recorded at two seconds 812; and notified presentation video service 230 of FIG. 2 of that determination. Recording session service 220 of FIG. 2 next compared the keyframes recorded at two seconds 812 to their corresponding keyframes recorded at three seconds 813. Recording session service 220 of FIG. 2 determined that there were differences between the document keyframe recorded at two seconds 812 and the document keyframe recorded at three seconds 813; and transported the document keyframe recorded at three seconds 813 to presentation video service 230 of FIG. 2. Recording session service 220 of FIG. 2 determined that there were no differences between the annotation and video keyframes; did not transport the annotation and video keyframes recorded at three seconds 813; and notified presentation video service 230 of FIG. 2 of that determination.

Recording session service 220 of FIG. 2, consistent with various embodiments, repeats this process of comparing corresponding keyframes (a keyframe and the next corresponding keyframe in sequence); transporting keyframes where differences were determined; and providing notifications where no differences were determined, for all recorded keyframes.

Example System for Presentation Recording Service

Figure 9:
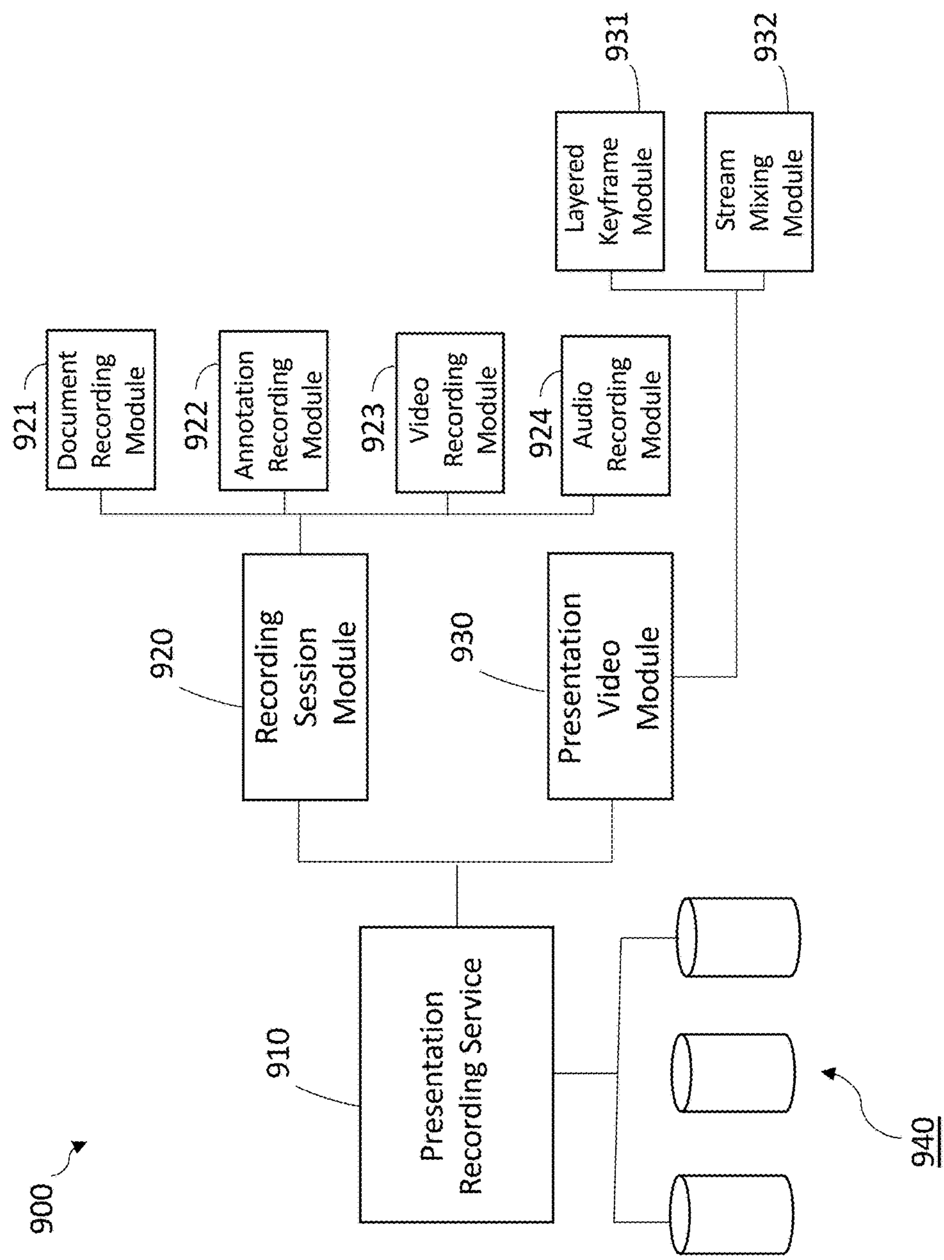
FIG. 9 is a block diagram of a system for a presentation recording service of FIG. 1, consistent with various embodiments.

Turning now to FIG. 9, FIG. 9 is a block diagram of a system for a presentation recording service of FIG. 1, consistent with various embodiments.

In various embodiments, system 900 is implemented to perform functions such as the functions of environment 100 of FIG. 1. In various embodiments, presentation recording service 910 may be similar to presentation recording service 120 of FIG. 1. Presentation recording service 910 includes modules to record presentation recordings sessions and to create presentation videos. These modules may be similar to the recording session and presentation video services of FIG. 2. Presentation recording service 910 includes recording session module 920 and presentation video module 930.

In various embodiments, recording session module 920 may be similar to recording session service 121 of FIG. 1. Recording session module 920 includes modules to record presentation recording sessions. These modules may be similar to the document, annotation, video and audio recording services of FIG. 2. Document recording module 921 may be similar to document recording service 221 of FIG. 2. Document recording module 921 facilitates the recordation of pages of documents presented using a user's device during the course of a presentation recording session, along with their corresponding document timestamps. Annotation recording module 922 may be similar to annotation recording service 222 of FIG. 2. Annotation recording module 922 facilitates the recordation of annotations of pages of documents presented using a user's device during the course of a presentation recording session, along with their corresponding annotation timestamps. Video recording module 923 may be similar to video recording service 223 of FIG. 2. Video recording module 923 facilitates the recordation of video images presented using a user's device during the course of a presentation recording session, along with their corresponding video timestamps. Audio recording module 924 may be similar to audio recording service 224 of FIG. 2. Audio recording module 924 facilitates the recordation of an audio stream during the course of a presentation recording session, along with its corresponding audio timestamps.

In various embodiments, presentation video module 930 may be similar to presentation video service 122 of FIG. 1. Presentation video module 930 module includes modules to create presentation videos. These modules may be similar to the layered keyframe and stream mixing services of FIG. 2. Layered keyframe module 931 may be similar to layered keyframe service 231 of FIG. 2. Layered keyframe module 931 facilitates the creation of layered keyframes with corresponding timestamps through the combination of document layers, annotation layers and/or video layers with corresponding timestamps of the same value. Layered keyframe module 931 also facilitates the creation of a keyframe video from a sequence of layered keyframes through transcoding of the digital images into a video format. Stream mixing module 932 may be similar to stream mixing service 232 of FIG. 2. Stream mixing module 932 facilitates the creation of a presentation video through the combination of a keyframe video and a recorded audio stream.

Figure 10:
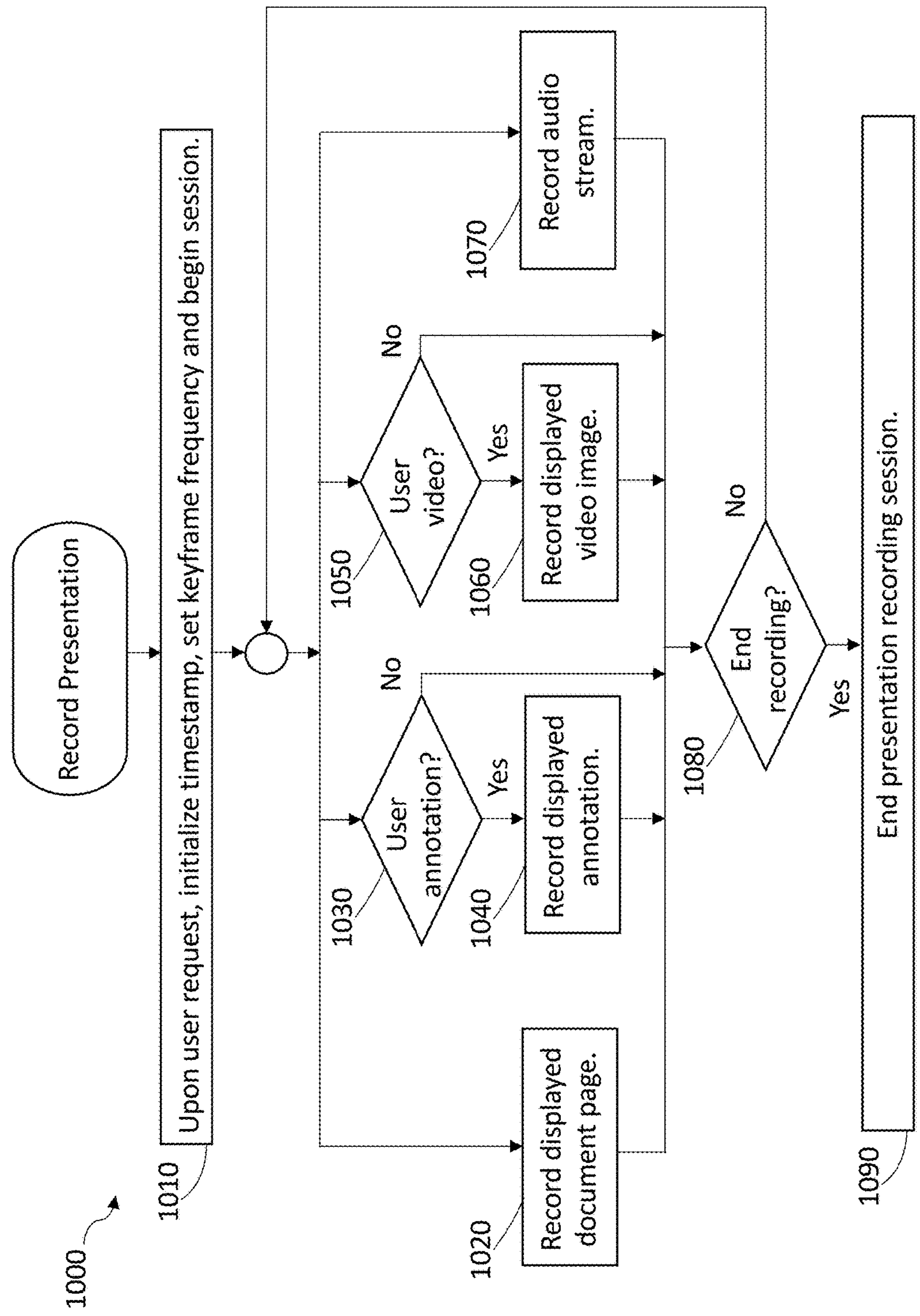
FIG. 10 is a flow diagram of a process of recording a presentation, consistent with various embodiments.

Turning now to FIG. 10, FIG. 10 is a flow diagram of a process of recording a presentation, consistent with various embodiments. In some embodiments, process 1000 may be executed in a system such as system 900 of FIG. 9. At block 1010, recording session module 920 receives a request from a user to start a presentation recording session; initializes a timestamp; sets the value for the keyframe frequency; and begins the presentation recording session processes. At block 1020, document recording module 921 records document pages which were presented using the user's device during the course of the presentation recording session. The pages are recorded as images in document keyframes with corresponding document timestamps at regular intervals as established by the keyframe frequency.

At block 1030, annotation recording module 922 determines, at regular intervals as established by the keyframe frequency, whether the user presented an annotation using the user's device during the course of the presentation recording session. If so, at block 1040, annotation recording module 922 records the presented annotation as an image in an annotation keyframe with a corresponding annotation timestamp. At block 1050, video recording module 923 determines, at regular intervals as established by the keyframe frequency, whether the user presented video using the user's device during the course of the presentation recording session. If so, at block 1060, video recording module 923 records the presented video as an image in a video keyframe with a corresponding video timestamp.

At block 1070, audio recording module 924 records an audio stream with corresponding audio timestamps during the course of the presentation recording session. At block 1080, recording session module 920 determines whether the user has requested to end the presentation recording session. If so, at block 1090, recording session module 920 ends the presentation recording session.

Figure 11:
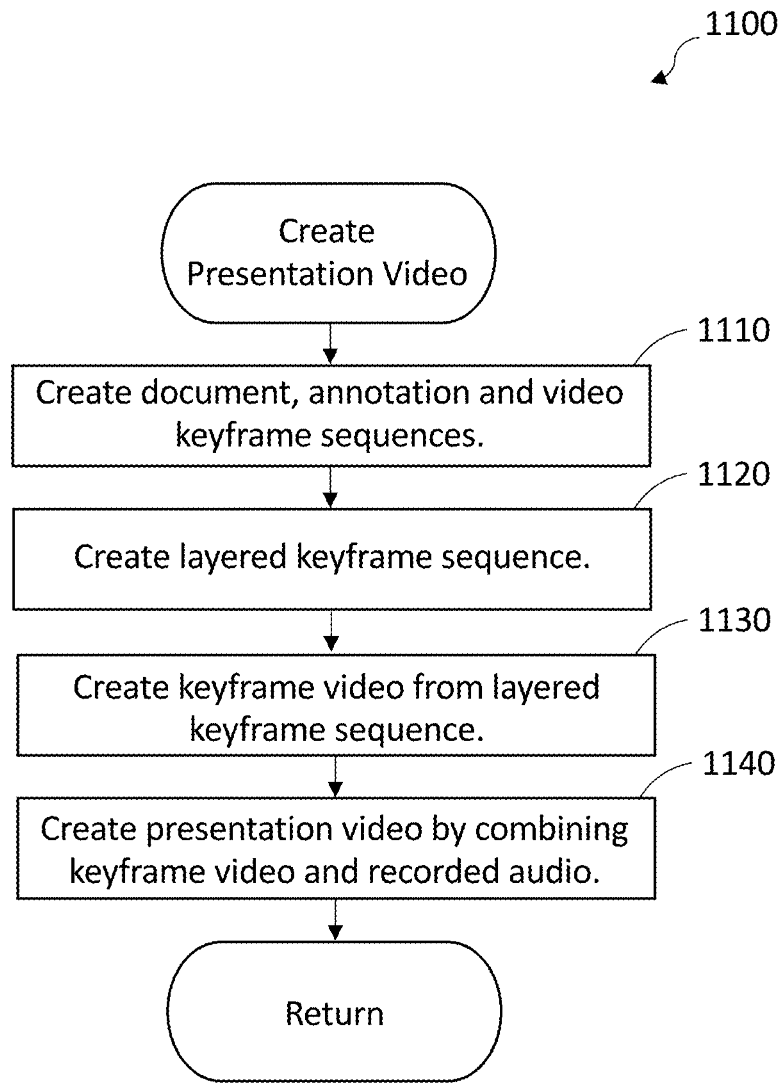
FIG. 11 is a flow diagram of a process of creating a presentation video, consistent with various embodiments.

Turning now to FIG. 11, FIG. 11 is a flow diagram of a process of creating a presentation video from a presentation recording session, consistent with various embodiments. In some embodiments, process 1100 may be executed in a system such as system 900 of FIG. 9. At block 1110, layered keyframe module 931 creates layered keyframes with corresponding timestamps by combining document layers, annotation layers and/or video layers with corresponding timestamps of the same values. A layered keyframe is created for each timestamp value corresponding to the related presentation recording session. At block 1120, layered keyframe module 931 creates a sequence of layered keyframes. At block 1130, layered keyframe module 931 creates a keyframe video by transcoding the images in the layered keyframe sequence into video format. At block 1140, stream mixing service 932 creates a presentation video by combining the keyframe video with the audio stream recorded during the related presentation recording session. The keyframe video and the recorded audio stream are synchronized through their associated timestamps.

Figure 12:
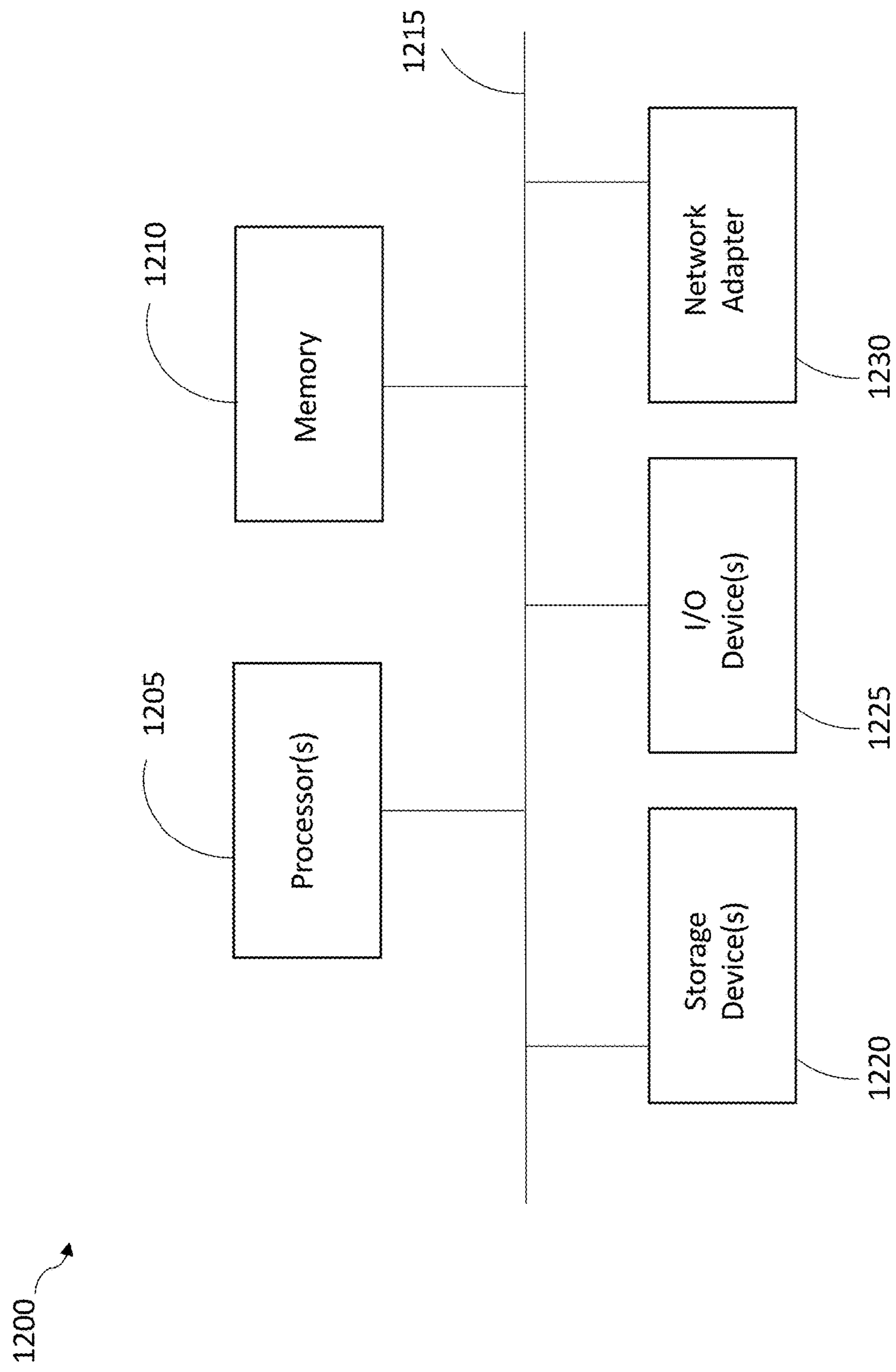
FIG. 12 is a block diagram illustrating components of an apparatus that may perform various operations described by the technology.

Turning now to FIG. 12, FIG. 12 is a block diagram illustrating components of an apparatus that may perform various operations described by the technology.

FIG. 12 is a block diagram of a computer system as may be used to implement features of some embodiments of the disclosed technology. Computing system 1200 may include one or more central processing units ("processors") 1205, memory 1210, input/output devices 1225 (e.g., key-board and pointing devices, and display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1210 and storage devices 1220 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media may include computer-readable media (e.g., "non-transitory" media) and computer-readable transmission media. The instructions stored in memory 1210 may be implemented as software and/or firmware to program the processor(s) 1205 to carry out actions described above. In some embodiments, such software or firmware may be initially provided to the processing system 1200 by downloading it from a remote system through the computing system 1200 (e.g., via network adapter 1230).

The technology introduced herein may be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure in this specification are used to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub-steps may be performed in parallel, illustrated logic may be omitted, other logic may be included, etc.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Furthermore, in the specification, figures and claims, reference is made to particular features (including method steps) of the invention. It is to be understood that the disclosure of the invention includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C may consist of (i.e., contain only) components A, B and C, or may contain not only components A, B, and C but also contain one or more other components.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," "program," "device," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. § 112 ¶ 6. Specifically, the use of "step of" in the claims herein is not intended to invoke the provisions of U.S.C. § 112 ¶ 916.

We claim:

1. A method comprising:

recording a sequence of document keyframes, a sequence of annotation keyframes, a sequence of video keyframes, and an audio stream via a recording session service;

comparing corresponding keyframes of each of the sequence of document keyframes, the sequence of annotation keyframes, and the sequence of video keyframes, wherein each of the corresponding keyframes includes a keyframe and a next corresponding keyframe in sequence;

transporting document keyframes from the recording session service to a presentation video service where differences between corresponding document keyframes are determined, transporting annotation keyframes from the recording session service to the presentation video service where differences between corresponding annotation keyframes are determined, and transporting video keyframes from the recording session service to the presentation video service where differences between corresponding video keyframes are determined, and wherein across all three layers of keyframes, only when differences in a sequence of keyframes are detected will keyframes be transported;

generating layered keyframes from transported document keyframes, annotation keyframes, and video keyframes, wherein the layered keyframes are generated by the presentation video service; and generating a presentation video by combining the layered keyframes with the audio stream.

2. A non-transitory, computer-readable medium storing program instructions that, when executed by a processor, cause the processor to perform a method comprising:

recording a sequence of document keyframes, a sequence of annotation keyframes, a sequence of video keyframes, and an audio stream;

comparing corresponding keyframes of each of the sequence of document keyframes, the sequence of annotation keyframes, and the sequence of video keyframes, wherein each of the corresponding keyframes includes a keyframe and a next corresponding keyframe in sequence; and transporting document keyframes to a presentation video service in which differences between corresponding document keyframes are determined, transporting annotation keyframes to the presentation video service in which differences between corresponding annotation keyframes are determined, and transporting video keyframes to the presentation video service in which differences between corresponding video keyframes are determined, wherein across all three layers of keyframes, only when differences in a sequence of keyframes are detected will keyframes be transported, wherein the presentation video service generates layered keyframes from transported document keyframes, annotation keyframes, and video keyframes, and wherein the presentation video service combines the layered keyframes with the audio stream to generate a presentation video.

3. The method of claim 1, wherein the recording session service is part of a client, and wherein the presentation video service is part of a server.

4. The method of claim 1, wherein the presentation video service generates the presentation video by transcoding the sequence of layered keyframes.

5. The method of claim 1, wherein the recording session service notifies the presentation video service when no differences are determined between corresponding keyframes.

6. The method of claim 1, wherein the presentation video is stored as a single video file.

7. The method of claim 1, wherein the recording session service records keyframes at a keyframe frequency, and wherein the keyframe frequency indicates a comparison interval between keyframes.

8. The method of claim 1, wherein, for each of the sequence of document keyframes, the sequence of annotation keyframes, and the sequence of video keyframes, the recording session service does not transport any keyframe that is the same as a corresponding prior recorded keyframe.

9. The non-transitory, computer-readable medium of claim 2, wherein the processor is part of a client, and wherein the presentation video service is part of a server, and wherein the client communicates keyframes to the server when differences are detected between corresponding keyframes in sequence.

10. The non-transitory, computer-readable medium of claim 2, wherein the presentation video service is notified when no differences are determined between corresponding keyframes.

11. The non-transitory, computer-readable medium of claim 2, wherein the presentation video service generates the presentation video by transcoding the sequence of layered keyframes.

12. The non-transitory, computer-readable medium of claim 2, wherein the presentation video is stored as a single video file.

13. The non-transitory, computer-readable medium of claim 2, wherein keyframes are recorded at a keyframe frequency, and wherein the keyframe frequency indicates a comparison interval between keyframes.

14. A system comprising:

a recording session service that records a sequence of document keyframes, a sequence of annotation keyframes, a sequence of video keyframes, and an audio stream, wherein the recording session service compares corresponding keyframes of each sequence of recorded keyframes, wherein the recording session service transports document keyframes where differences between corresponding document keyframes are determined, wherein the recording session service transports annotation keyframes where differences between corresponding annotation keyframes are determined, wherein the recording session service transports video keyframes where differences between corresponding video keyframes are determined, and wherein across all three layers of keyframes, only when differences in a sequence of keyframes are detected will keyframes be transported; and a presentation video service that receives keyframes transported by the recording session service, wherein presentation video service creates a sequence of layered keyframes from the document keyframes, the annotation keyframes, and the video keyframes received from the recording session service, wherein the presentation video service creates a keyframe video by transcoding the sequence of layered keyframes, and wherein the presentation video service combines the keyframe video and the audio stream thereby forming a presentation video.

15. The system of claim 14, wherein the recording session service notifies the presentation video service when no differences are determined between corresponding keyframes.

16. The system of claim 15, wherein when no differences are determined between corresponding keyframes, the presentation video service uses the received keyframe as a next keyframe in forming the sequence of layered keyframes.

17. The system of claim 14, wherein the presentation video is stored as a single video file.

18. The system of claim 14, wherein the recording session service records keyframes at a keyframe frequency, and wherein the keyframe frequency indicates a comparison interval between keyframes.

19. The system of claim 14, wherein, for each of the sequence of document keyframes, the sequence of annotation keyframes, and the sequence of video keyframes, the recording session service does not transport any keyframe that is the same as a corresponding prior recorded keyframe.

20. The system of claim 14, wherein the recording session service operates on a client, wherein the presentation video service operates on a server, and wherein the recording session service transports document keyframes, annotation keyframes, video keyframes, and the audio stream to the presentation video service over a network.

* * * * *